(12) United States Patent
Rudy et al.

(10) Patent No.: US 8,307,539 B1
(45) Date of Patent: Nov. 13, 2012

(54) METHOD FOR MODELING DEVICES IN A WAFER

(75) Inventors: Steven C. Rudy, San Jose, CA (US);
Eric R. Mckie, Pleasanton, CA (US);
Mark D. Moravec, Gilroy, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 316 days.

(21) Appl. No.: 12/571,261

(22) Filed: Sep. 30, 2009

(51) Int. Cl.
*G11B 5/127* (2006.01)
*H04R 31/00* (2006.01)

(52) U.S. Cl. ............ 29/603.09; 29/603.1; 29/603.12; 216/62; 216/65; 216/66; 360/324.1; 360/324.11; 360/324.12; 360/324.2

(58) Field of Classification Search ........ 29/603.09, 29/603.1, 603.12; 360/324.1, 324.11, 324.12, 360/324.2; 216/62, 65, 66
See application file for complete search history.

(56) References Cited

U.S. PATENT DOCUMENTS

| | | | |
|---|---|---|---|
| 4,157,497 A | 6/1979 | Eisen et al. | |
| 4,670,732 A | 6/1987 | Church | |
| 4,675,986 A | 6/1987 | Yen | |
| 5,065,483 A | 11/1991 | Zammit | |
| 5,210,667 A | 5/1993 | Zammit | |
| 5,361,547 A | 11/1994 | Church et al. | |
| 5,597,340 A | 1/1997 | Church et al. | |
| 5,678,086 A | 10/1997 | Gandola et al. | |
| 5,722,155 A | 3/1998 | Stover et al. | |
| 5,742,995 A * | 4/1998 | Amin et al. ............. 29/603.1 |
| 5,772,493 A | 6/1998 | Rottmayer et al. | |
| 5,876,264 A | 3/1999 | Church et al. | |
| 6,003,361 A | 12/1999 | Amin et al. | |
| 6,027,397 A | 2/2000 | Church et al. | |
| 6,047,224 A | 4/2000 | Stover et al. | |
| 6,083,081 A | 7/2000 | Fukuroi et al. | |
| 6,193,584 B1 | 2/2001 | Rudy et al. | |
| 6,288,870 B1 | 9/2001 | Saliba | |
| 6,347,983 B1 | 2/2002 | Hao et al. | |
| 6,364,743 B1 | 4/2002 | Pust et al. | |
| 6,399,401 B1 | 6/2002 | Kye et al. | |
| 6,475,064 B2 | 11/2002 | Hao et al. | |

(Continued)

FOREIGN PATENT DOCUMENTS

JP 2000067408 A 3/2000

OTHER PUBLICATIONS

Matsushita, et al., "Elaborate Precision Machining Technologies for Creating High Added Value at Low Cost", Fujitsu Sci. Tech. J., 43, 1, pp. 67-75, Jan. 2007.

*Primary Examiner* — Paul D Kim

(57) ABSTRACT

A method for modeling devices in a wafer comprises the step of providing the wafer comprising a first plurality of devices having a track width and a first stripe height, a second plurality of devices having the track width and a second stripe height, and a third plurality of devices having the track width and a third stripe height. The method further comprises the steps of measuring resistance values for the first, second and third plurality of devices to obtain a data set correlating a stripe height and a resistance value for each of the first, second and third plurality of devices, and estimating a linear relationship between resistance and inverse stripe height for the first, second and third plurality of devices based on the data set.

20 Claims, 6 Drawing Sheets

U.S. PATENT DOCUMENTS

| | | | |
|---|---|---|---|
| 6,532,646 B2 | 3/2003 | Watanuki | |
| 6,609,948 B1 | 8/2003 | Fontana, Jr. et al. | |
| 6,623,330 B2 | 9/2003 | Fukuroi | |
| 6,674,610 B1 | 1/2004 | Thomas et al. | |
| 6,684,171 B2 | 1/2004 | Church et al. | |
| 6,699,102 B2 | 3/2004 | Reiley et al. | |
| 6,728,067 B2 | 4/2004 | Crawforth et al. | |
| 6,758,722 B2 | 7/2004 | Zhu | |
| 6,760,197 B2 | 7/2004 | Boutaghou et al. | |
| 6,786,803 B2 * | 9/2004 | Crawforth et al. | 451/41 |
| 6,793,557 B2 | 9/2004 | Bunch et al. | |
| 6,846,222 B2 | 1/2005 | Church et al. | |
| 6,857,937 B2 | 2/2005 | Bajorek | |
| 6,884,148 B1 | 4/2005 | Dovek et al. | |
| 6,935,923 B2 | 8/2005 | Burbank et al. | |
| 6,950,289 B2 | 9/2005 | Lam et al. | |
| 6,982,042 B2 | 1/2006 | Church et al. | |
| 7,014,530 B2 | 3/2006 | Kasiraj et al. | |
| 7,139,152 B2 | 11/2006 | Mahnad et al. | |
| 7,149,061 B2 | 12/2006 | Yamakura et al. | |
| 7,206,172 B2 | 4/2007 | Ding et al. | |
| 7,244,169 B2 | 7/2007 | Cyrille et al. | |
| 7,245,459 B2 | 7/2007 | Cyrille et al. | |
| 7,268,976 B2 | 9/2007 | Yamakura et al. | |
| 7,271,982 B2 | 9/2007 | MacDonald et al. | |
| 7,272,883 B2 | 9/2007 | Le et al. | |
| 7,287,316 B2 | 10/2007 | Kasahara et al. | |
| 7,333,300 B2 | 2/2008 | Church et al. | |
| 7,359,152 B2 | 4/2008 | Matono et al. | |
| 7,360,296 B2 | 4/2008 | Cyrille et al. | |
| 7,393,262 B2 | 7/2008 | Biskeborn | |
| 7,422,511 B2 * | 9/2008 | Fukuroi | 451/5 |
| 7,551,406 B1 | 6/2009 | Thomas et al. | |
| 7,554,767 B1 | 6/2009 | Hu et al. | |
| 7,564,110 B2 | 7/2009 | Beach et al. | |
| 7,603,762 B2 | 10/2009 | Baer et al. | |
| 7,643,250 B2 | 1/2010 | Araki et al. | |
| 7,716,814 B2 * | 5/2010 | Sasaki et al. | 29/603.16 |
| 7,770,281 B2 | 8/2010 | Pentek | |
| 7,788,796 B2 | 9/2010 | Hsiao et al. | |
| 7,861,400 B2 | 1/2011 | Lille | |
| 8,151,441 B1 | 4/2012 | Rudy et al. | |
| 8,165,709 B1 | 4/2012 | Rudy | |
| 2001/0004800 A1 | 6/2001 | Yoshida et al. | |
| 2001/0051491 A1 | 12/2001 | Hao et al. | |
| 2002/0012204 A1 | 1/2002 | Boutaghou et al. | |
| 2002/0173227 A1 | 11/2002 | Lam et al. | |
| 2003/0020467 A1 | 1/2003 | Kasahara et al. | |
| 2003/0021069 A1 | 1/2003 | Crawforth et al. | |
| 2004/0009739 A1 | 1/2004 | Zhu | |
| 2004/0075942 A1 | 4/2004 | Bajorek | |
| 2004/0097173 A1 | 5/2004 | Crawforth et al. | |
| 2004/0179310 A1 | 9/2004 | Lam et al. | |
| 2005/0023673 A1 | 2/2005 | Nowak | |
| 2005/0028354 A1 | 2/2005 | Shindo et al. | |
| 2005/0070206 A1 | 3/2005 | Kasiraj et al. | |
| 2005/0164607 A1 | 7/2005 | Bajorek | |
| 2005/0180048 A1 | 8/2005 | MacDonald et al. | |
| 2005/0185345 A1 | 8/2005 | Ding et al. | |
| 2005/0219752 A1 | 10/2005 | Takahashi | |
| 2006/0027528 A1 | 2/2006 | Church et al. | |
| 2006/0028770 A1 | 2/2006 | Etoh et al. | |
| 2006/0034021 A1 | 2/2006 | Wu | |
| 2006/0044683 A1 | 3/2006 | Matono et al. | |
| 2006/0103990 A1 | 5/2006 | Ito et al. | |
| 2006/0126222 A1 | 6/2006 | Aoki et al. | |
| 2006/0139802 A1 | 6/2006 | Sasaki et al. | |
| 2006/0168798 A1 | 8/2006 | Naka | |
| 2007/0008660 A1 | 1/2007 | Yamakura et al. | |
| 2007/0070543 A1 | 3/2007 | Gunder et al. | |
| 2007/0246761 A1 | 10/2007 | Beach et al. | |
| 2008/0013219 A1 | 1/2008 | Wu | |
| 2008/0072418 A1 | 3/2008 | Kondo et al. | |
| 2008/0144215 A1 | 6/2008 | Hsiao et al. | |
| 2008/0273275 A1 | 11/2008 | Lille | |
| 2009/0152235 A1 | 6/2009 | Hsiao et al. | |
| 2009/0211081 A1 | 8/2009 | Boone, Jr. et al. | |
| 2009/0268348 A1 | 10/2009 | Bonhote et al. | |
| 2010/0162556 A1 | 7/2010 | Guruz et al. | |
| 2010/0165513 A1 | 7/2010 | Bonhote et al. | |
| 2010/0208391 A1 | 8/2010 | Gokemeijer | |

\* cited by examiner

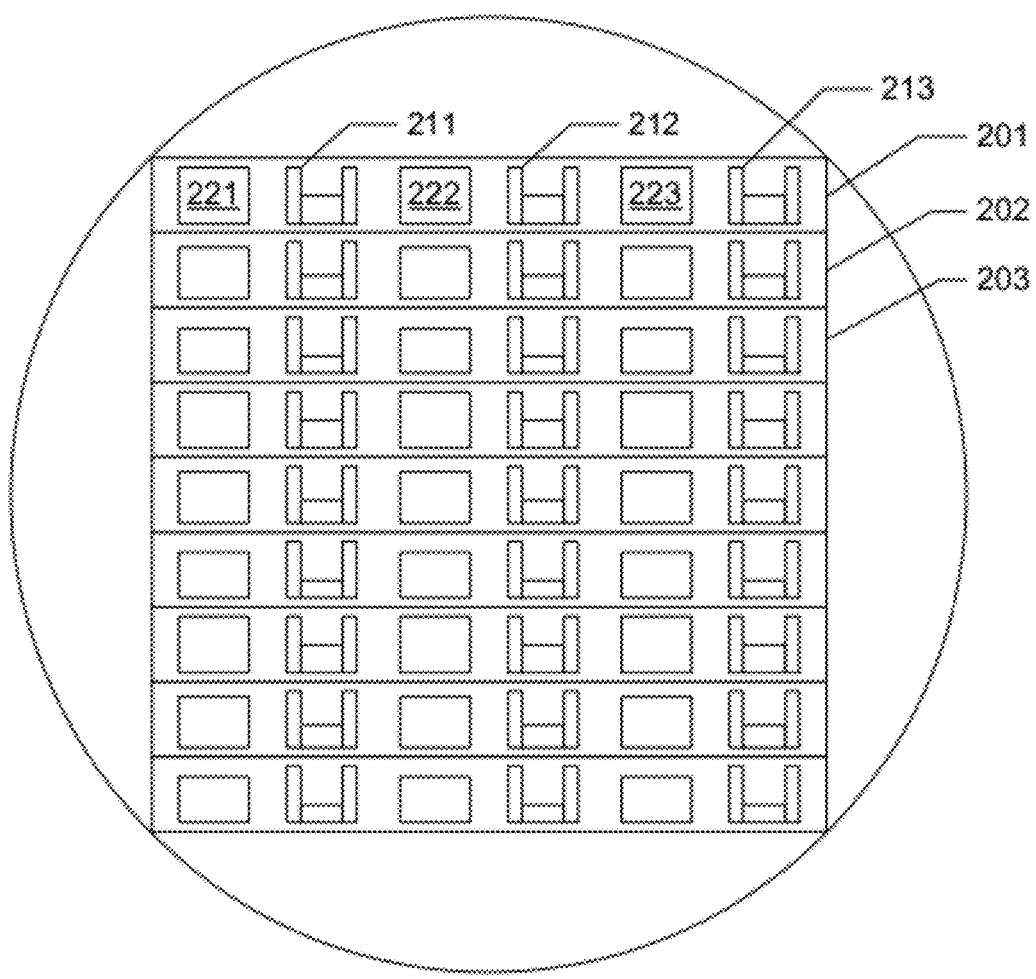

METHOD FOR MODELING DEVICES IN A WAFER

FIELD OF THE INVENTION

The present invention generally relates to hard disk drives and, in particular, relates to the characterization of resistance vs. stripe height from wafer level test data.

BACKGROUND OF THE INVENTION

Magnetic disk drives are used to store and retrieve data for digital electronic apparatuses such as computers. In FIGS. 1A and 1B, a magnetic disk drive 10 of the prior art includes a sealed enclosure 12, a disk drive motor 14, a magnetic disk 16, supported for rotation by a spindle S1 of motor 14, an actuator 18 and an arm 20 attached to a spindle S2 of actuator 18. A suspension 22 is coupled at one end to the arm 20, and at its other end to a read/write head or transducer 24. The transducer 24 typically includes an inductive write element with a magnetoresistive read element (shown in FIG. 1C). As the motor 14 rotates the magnetic disk 16, as indicated by the arrow R, an air bearing is formed under the transducer 24 causing it to lift slightly off of the surface of the magnetic disk 16, or, as it is termed in the art, to "fly" above the magnetic disk 16. Various magnetic "tracks" of information can be read from the magnetic disk 16 as the actuator 18 causes the transducer 24 to pivot in a short arc as indicated by the arrows P. The design and manufacture of magnetic disk drives is well known to those skilled in the art.

FIG. 1C depicts a magnetic read/write head 30 including a write element 32 and read element 34. The edges of the write element 32 and read element 34 also define an air bearing surface ABS in a plane 33, which flies above the surface of the magnetic disk 16 during operation.

Read element 34 includes a first shield 44, a second shield 48, an intermediate layer 38 and a read sensor 46 located between the first shield 44 and the second shield 48. The read sensor 46 has a particular stripe height, SH, and a particular location between the first shield 44 and the second shield 48, both of which are chosen to attain particular read performance. Control of stripe height is important in controlling device resistance, device output amplitude, device bias point and consequently many related measures of performance. MR sensors can be used with a variety of stripe heights, with a typical SH being smaller than 2 microns, including much less than 1 micron. Further, although the read sensor 46 is shown as a shielded single element vertical read sensor, the read element 34 can take a variety of forms as is known to those skilled in the art. The design and manufacture of magnetoresistive heads, such as read sensor 46, are well known to those skilled in the art.

Write element 32 is typically an inductive write element including the intermediate layer 38 which shields the read element and may serve as a secondary return pole, a first yoke element or pole 36 which serves as the primary write pole, and a second yoke element or pole 37 which serves as the primary return pole and a write gap 40 which separates the first yoke element 36 and the second yoke element 37. The first yoke element 36 and the second yoke element 37 are configured and arranged relative to each other such that the write gap 40 has a particular throat height, TH. The nose length, NL, as typically used in describing a perpendicular write element is parallel to the plane shown and is typically determined solely within the first yoke element 36. Also included in write element 32 is a conductive coil 42 that is positioned within a dielectric medium 43. As is well know to those skilled in the art, these elements operate to magnetically write data on a magnetic medium such as a magnetic disk 16.

The formation of a read/write head 30 begins with a wafer 50, as shown in FIG. 1D, which includes, formed over a substrate, sets of several layers or films of various materials that form an array of read/write heads (not shown), including the elements of the read/write head 30 that are shown in FIG. 1C. The wafer 50 is then divided into multiple slider bars 52 such that each slider bar 52 has a first cut surface, or edge, 54 and a second cut surface, or edge, 56 substantially parallel to each other. As can be better seen in FIG. 1E, each slider bar 52 may include several read/write heads 60 in series along the bar. For example, a typical slider bar may include about fifty to sixty (50-60) read/write heads 60. As is shown in FIG. 1E, the read/write heads 60 can be of different configuration, however, alternatively each of the write/read heads 60 along the slider bar 52 can be of approximately the same configuration.

As is shown in FIG. 1E, the second cut surface 56 is formed such that the read/write heads 60 extend through to the second cut surface 56. Thus, at the second cut surface 56, the read/write heads 60 are exposed and therefore available for removing material along the second cut surface 56 in a process termed lapping. Alternatively, the read/write heads 60 can extend to near the second cut surface 56, without being initially exposed. In such a case, the read/write heads 60 can become exposed and material can be removed therefrom during the lapping process.

The goal of lapping is to remove material from the second cut surface 56, which defines a lapping plane L, to form the ABS (also shown in FIG. 1C) of each of the read/write heads 60 in the plane 33. More particularly, it is the objective of the lapping process to define the ABS at a precise predetermined distance from the upper edge 64 of the read sensor 46 where the upper edge 64 is defined by wafer processes. In this way, the stripe height SH of the read sensor 46 (shown in FIG. 1C) is defined substantially orthogonal to the lapping plane L, and the nose length NL is similarly defined substantially orthogonal to the lapping plane L. After lapping, the read/write heads are then each cut from the slider bar to form individual read/write heads.

FIG. 1F shows a typical lapping machine 70. The slider bar 52 is held along the first cut surface 54 by a jig 72. In turn, the jig 72 is contacted by pistons 74 at various bending points 76 along the length of the jig 72. Pistons 74 may be, for example, dual action air cylinders, and are configured to deflect the jig 72 at the bending points 76 by a particular amount. To obtain this particular amount, a controller 78 is used to regulate the operation of the pistons 74. The slider bar 52 is further oriented such that the second cut surface 56 lies substantially parallel to an upper surface 80 of a lapping plate 82. During lapping, an abrasive material, for example a diamond slurry, is introduced between the second cut surface 56 of the slider bar 52 and the upper surface 80 of the lapping plate 82. When the second cut surface 56 is brought into contact or near-contact with the upper surface 80, the slider bar 52 and the lapping plate 82 are moved relative to each other within the plane defined by the second cut surface 56 and the upper surface 80. This movement, along with the forces acting to press together the upper surface 80 and the second cut surface 56 and with the abrasive material placed therebetween, acts to abrasively lap the second cut surface 56 and thereby the read/write heads 60.

Because of the critical nature of the stripe height, SH, it is important to end the lapping process at the particular point which attains the correct stripe height. While lapping times, lapping pressures, and other lapping parameters could be standardized for particular types of slider bars 52, such a method can be ineffective due to fabrication variations such as in the deposition of materials of the read/write heads 60, or the wafer cut locations relative to the read/write heads. More particularly, some fabrication variations may exist within a single slider bar or a single wafer, with variations increasing with distance, while others may exist between different wafers (i.e., wafer-to-wafer variation).

One approach to determining an appropriate stopping point for a lapping operation involves disposing an electronic lapping guide (ELG) near a read or write head to be lapped. The ELG includes a resistive element connected through leads to a device that monitors the resistance of the ELG. The resistive element has a height orthogonal to the lapping surface, next to which it is disposed, such that during the lapping operation, the resistive element is lapped away, increasing the resistance of the ELG. When the resistance of the ELG reaches a predetermined resistance value corresponding to a desired stripe height/nose length in the nearby device, the lapping operation is stopped.

To determine the predetermined resistance at which the lapping operation should be stopped, a model that relates the measured resistance of an ELG to the remaining height of the resistive element of the ELG may be used. To create such model requires multiple data points, which may be obtained by imaging cross-sections of partially-lapped ELGs to correlate the measured resistance of the ELGs with different remaining resistive element heights. This approach, however, relying as it does upon scanning electron microscopy, is complicated and slow, and can only be accomplished after a wafer has been cut into slider bars, and after the slider bars have been at least partially lapped.

SUMMARY OF THE INVENTION

Various embodiments of the present invention solve the foregoing problems by providing a non-destructive wafer-level resistance modeling technique that correlates the resistance and inverse stripe height of a device, such as an ELG or even a read head, to be modeled based on measurements taken from an intact wafer. The approach involves a uniquely designed wafer in which otherwise similar devices in different regions have different initial stripe heights, whereby multiple data points correlating measured resistance and stripe height can be determined.

According to one embodiment of the subject disclosure, a method for modeling devices in a wafer comprises the step of providing the wafer comprising a first plurality of devices having a track width TW and a first stripe height $SH_1$, a second plurality of devices having the track width TW and a second stripe height $SH_2$, and a third plurality of devices having the track width TW and a third stripe height $SH_3$. The method further comprises the steps of measuring resistance values for the first, second and third plurality of devices to obtain a data set correlating a stripe height and a resistance value for each of the first, second and third plurality of devices, and estimating a linear relationship between resistance and inverse stripe height for the first, second and third plurality of devices based on the data set.

According to another embodiment of the subject disclosure, a wafer comprises a first plurality of devices having a track width TW and a first stripe height $SH_1$, a second plurality of devices having the track width TW and a second stripe height $SH_2$, and a third plurality of devices having the track width TW and a third stripe height $SH_3$. The first, second and third plurality of devices are arranged in corresponding first, second and third rows.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings:

FIG. 2 illustrates a wafer in accordance with one aspect of the subject disclosure;

DETAILED DESCRIPTION OF THE INVENTION

Figure 1A:
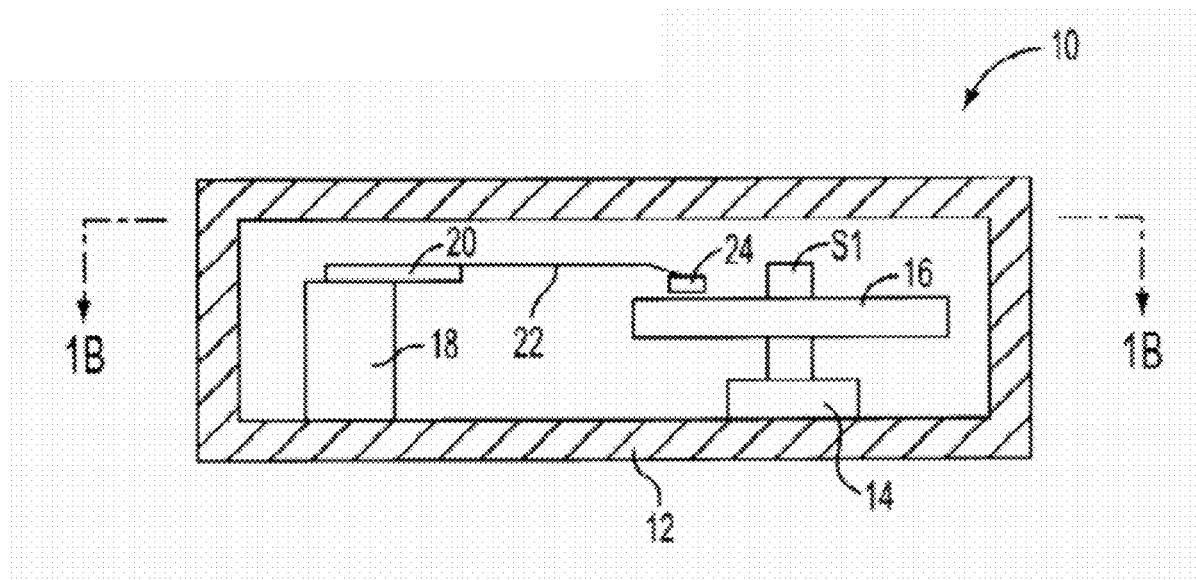
FIG. 1A is a partial cross-sectional front elevation view of a magnetic disk drive assembly.
Figure 1B:
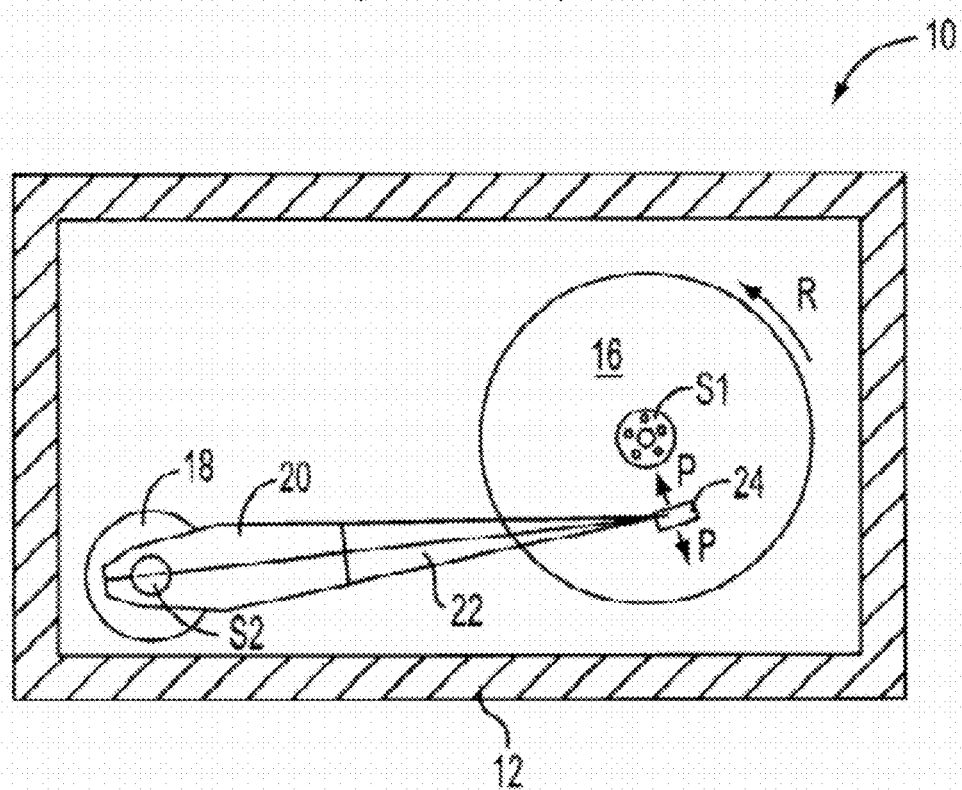
FIG. 1B is a top plan view taken along line 1B-1B of FIG. 1A.
Figure 1C:
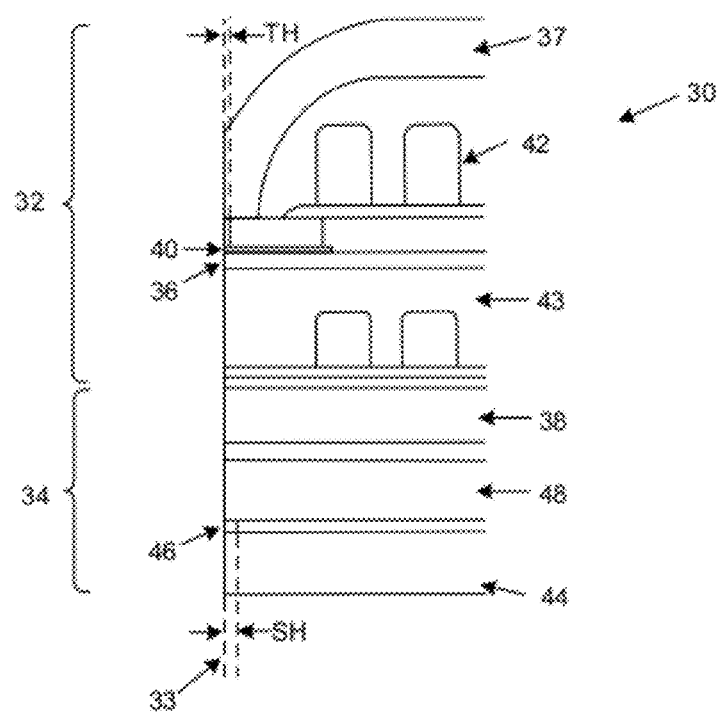
FIG. 1C is a cross-sectional side view of a read-write head incorporating a shielded magnetoresistive read sensor.
Figure 1D:
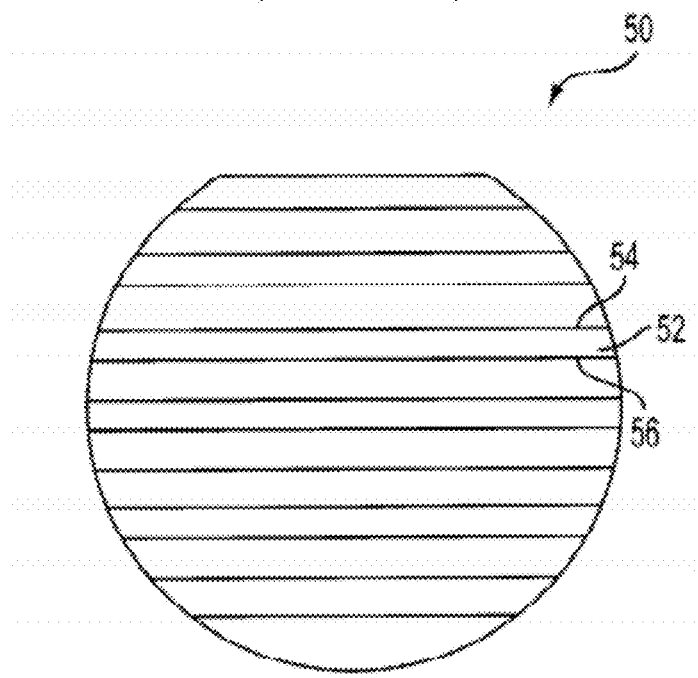
FIG. 1D is a plan view of a wafer including multiple slider bars that incorporate multiple read-write heads.
Figure 1E:
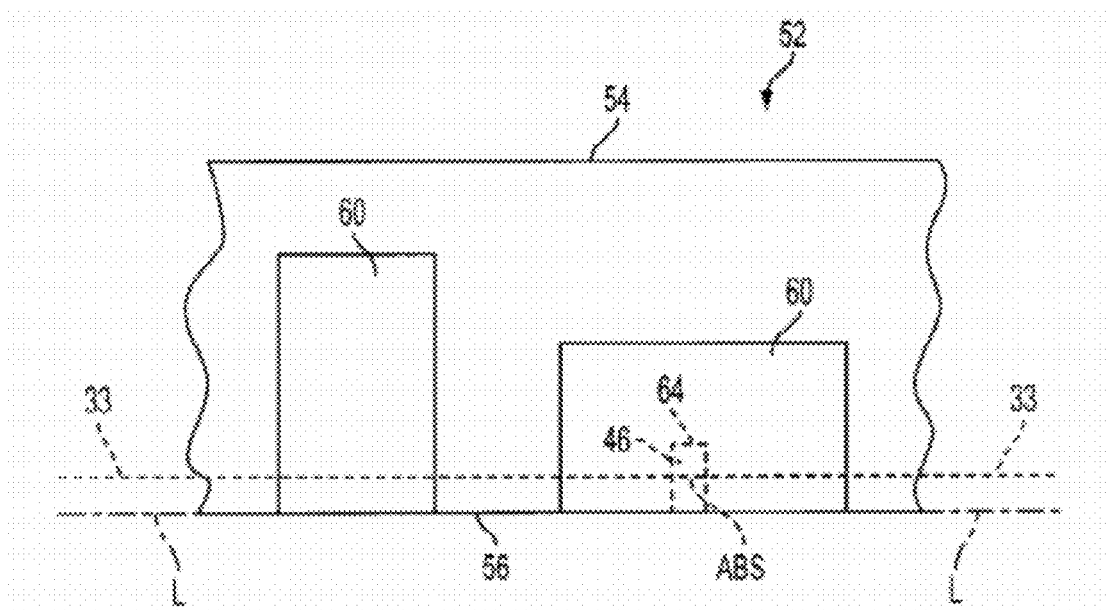
FIG. 1E is a partial plan view of an individual one of the slider bars shown in FIG. 1D.
Figure 1F:
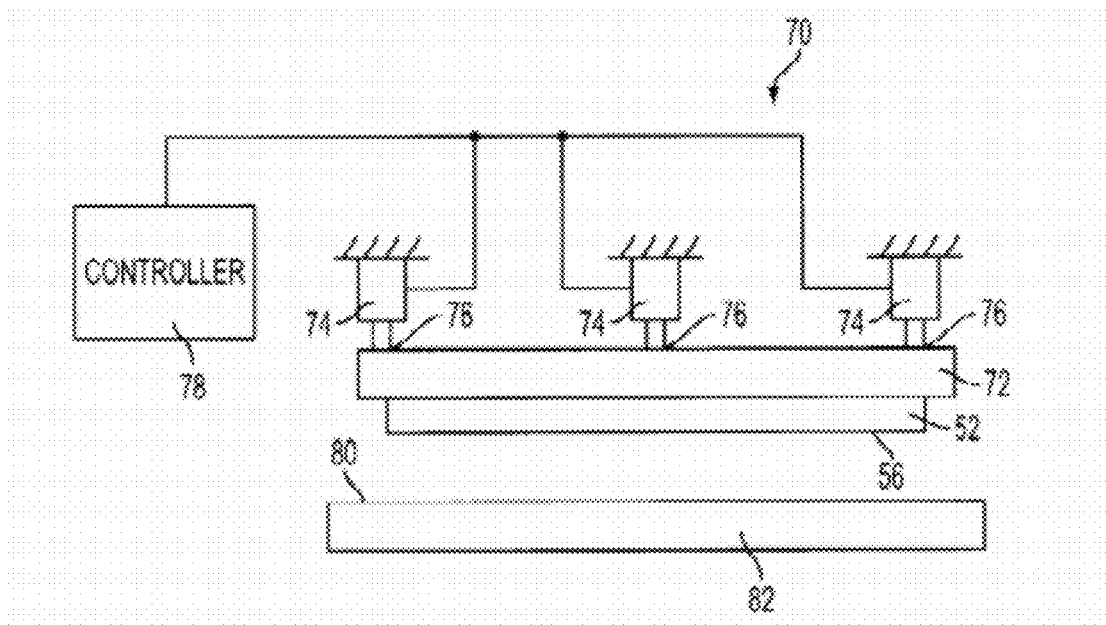
FIG. 1F is a schematic diagram of a lapping machine in which a slider bar is positioned.

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

FIG. 2 illustrates a wafer in accordance with one aspect of the subject disclosure, in which different regions of the wafer include devices with different stripe heights. In this regard, region 201 includes a plurality of ELGs 211, 212 and 213 with a first resistive element stripe height, while region 202 includes a plurality of ELGs with a second resistive element stripe height, and region 203 includes a plurality of ELGs with a third resistive element stripe height. Region 201 further includes a plurality of read heads 221, 222 and 223 with a first reader stripe height, while region 202 includes a plurality of read heads with a second reader stripe height, and region 203 includes a plurality of read heads with a third reader stripe height. The remaining regions on the wafer may repeat this sequential pattern, such that each region (other than the outermost) abuts two regions with devices having different stripe heights.

As can be seen with reference to FIG. 2, the regions of the wafer may be organized into rows that may be cut apart to form slider bars, such that each slider bar has ELGs with the same resistive element stripe height and read heads with the same reader stripe height. According to alternative embodiments of the subject disclosure, however, the regions may be organized in any one of a number of arrangements, including columns, grids, or the like.

While in the exemplary embodiment illustrated in FIG. 2, there are illustrated a repeating sequence of three rows with three different stripe heights for each ELG and/or read head, the scope of the present invention is not limited to such an arrangement. Rather, as will be readily apparent to those of skill in the art in view of the subject disclosure, the present invention has application to wafers with any one of a number of different designs. For example, there may be more than three unique regions in a wafer, each having devices with different stripe heights. In accordance with one exemplary embodiment, for example, there may be devices with five different stripe heights in repeating sequences of five rows. Moreover, the rows may not necessarily be arranged in a repeating sequence, but may be arranged in any one of a number of other manners. For example, in a wafer in which devices with more than three different stripe heights are provided, the pattern of regions may be arranged such that each region abuts regions with devices having only incremental differences in stripe height (e.g., rows arranged with $SH_1$, $SH_2$, $SH_3$, $SH_4$, $SH_3$, $SH_2$, $SH_1$, $SH_2$, etc., instead of $SH_1$, $SH_2$, $SH_3$, $SH_4$, $SH_1$, $SH_2$, etc.).

Figure 3:
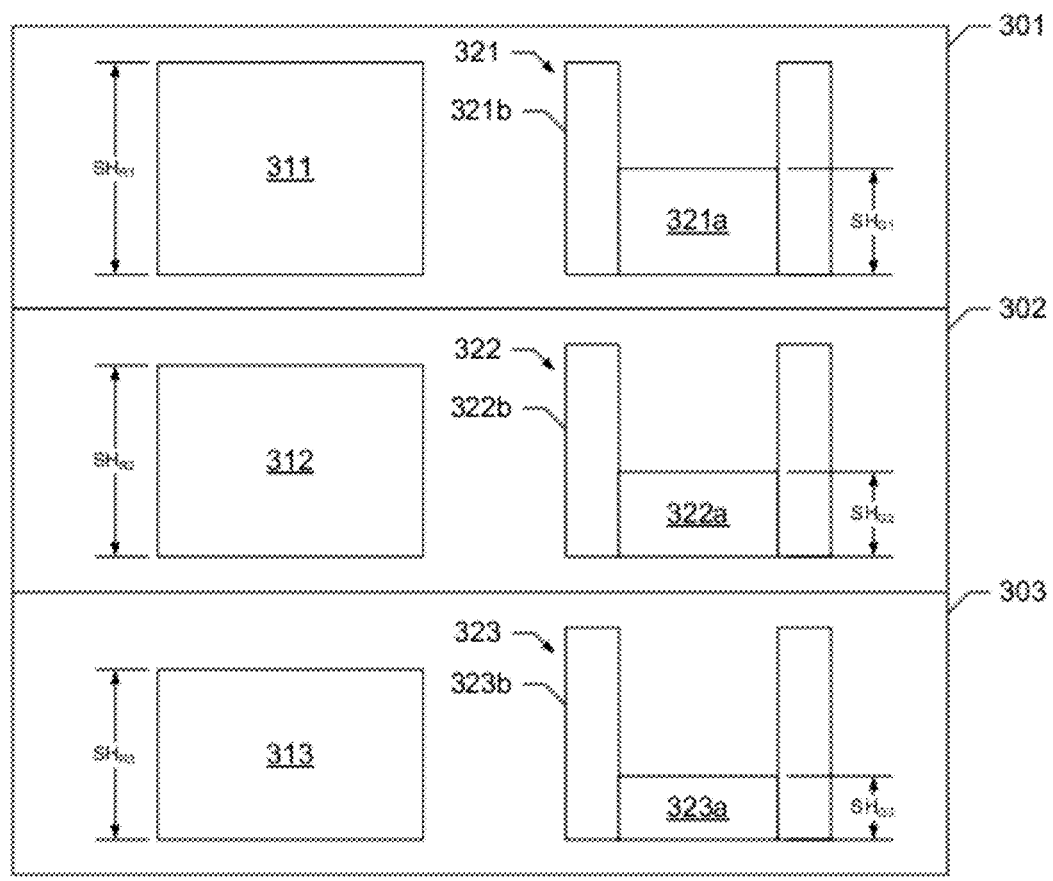
FIG. 3 illustrates a closer partial view of a wafer in accordance with one aspect of the subject disclosure.

Turning to FIG. 3, a closer partial view of a wafer with devices having different stripe heights is illustrated in accordance with one aspect of the subject disclosure. In a first region 301, the wafer includes one or more devices, such as reader 311 and ELG 321, which have stripe heights differing from similar devices in region 302 and 303. For example, reader 311 in region 301 has a stripe height $SH_{R1}$, reader 312 in region 302 has a stripe height $SH_{R2}$, and reader 313 in region 303 has a stripe height $SH_{R3}$, where $SH_{R1} > SH_{R2} > SH_{R3}$. Similarly, ELG 321 in region 301 has a resistive element 321a with a stripe height $SH_{G1}$, ELG 322 in region 302 has a resistive element 322a with a stripe height $SH_{G2}$, and ELG 323 in region 303 has a resistive element 323a with a stripe height $SH_{G3}$, where $SH_{G1} > SH_{G2} > SH_{G3}$. By measuring the resistance of each reader or of each ELG at the wafer level, the relationship between the resistance and stripe height thereof can be modeled based on the differing stripe heights without having to perform any destructive cross-sectional imaging.

The measured resistance $R_{ELG}$ of an ELG varies with respect to the stripe height thereof according to the relationship $R_{ELG} = R_{leads} + (Rs \times TW)/SH$. Accordingly, there exists a linear relationship between the resistance of the ELG and the inverse of the stripe height of the resistive element thereof, where the intercept of the line is equal to the resistance of the leads of the ELG, and where the slope of the line is equal to the sheet resistance Rs of the ELG times its track width TW. To model the relationship between stripe height and resistance of ELGs 321, 322 and 323, a measurement of the resistance of each ELG may be made by probing the leads thereof (such as leads 321b, 322b and 323b) at the wafer level. A data set based on these measured resistances ($R_{G1}$ for ELG 321, $R_{G2}$ for ELG 322, and $R_{G3}$ for ELG 323) and the inverse stripe height of each ELG ($1/SH_{G1}$ for ELG 321, $1/SH_{G2}$ for ELG 322 and $1/SH_{G3}$ for ELG 323) may be used to determine the slope and line values for this linear relationship as follows.

The slope of the line may be calculated according to the equation:

$$\text{Slope} = \frac{\left(\sum_{i=1}^{n} x_i y_i\right) - n\bar{x}\bar{y}}{\sum_{i=1}^{n} x_i^2 - n\bar{x}^2},$$

where n is a number of points in the data set, x is an inverse of a stripe height in the data set, and y is a resistance value in the data set. Similarly, the intercept of the line may be calculated according to the equation:

$$\text{Intercept} = \frac{\bar{y}\left(\sum_{i=1}^{n} x_i^2\right) - \bar{x}\sum_{i=1}^{n} x_i y_i}{\sum_{i=1}^{n} x_i^2 - n\bar{x}^2}.$$

According to one aspect of the subject disclosure, the different stripe heights of the devices in the wafer may be offset by a fixed increment $\delta H$, whereby $SH_1 + \delta H = SH_2$ and $SH_2 + \delta H = SH_3$. For example, in a wafer including ELGs with five different stripe heights, the stripe heights of the ELGs may be incremented in 1 micron steps from 4 microns to 8 microns. In a wafer including tunneling magnetoresistive read heads having five different stripe heights, the stripe heights of the read heads may be incremented in 30 nm steps from 150 nm to 270 nm. Such an arrangement may facilitate the estimation of the stripe heights used in calculating the relationship between resistance and stripe height of the devices. In this regard, rather than relying upon the design parameters (e.g., the intended stripe height of the device based upon the wafer mask design) to determine the stripe height in each data point of the data set, the stripe heights may be estimated based upon resistance measurements made at the wafer level. For example, in an embodiment in which devices having three different stripe heights ($SH_1$, $SH_2$ and $SH_3$) separated by a fixed increment are provided in the wafer, the stripe heights may be calculated according to the formula:

$SH_1 + \delta H = SH_3 - \delta H = SH_2 = 2\delta H((R_3 - R_1)/(R_3 + R_1 - 2R_2))$ wherein $R_1$ is a measured resistance value for one of the devices with the first stripe height $SH_1$, $R_2$ is a measured resistance value for one of the devices with the second stripe height $SH_2$, and $R_3$ is a measured resistance value for one of the devices with the third stripe height $SH_3$.

In accordance with one aspect of the subject disclosure, a similar method may be used to estimate the stripe heights of devices when a wafer includes devices with more than three stripe heights separated by a fixed increment. In this regard, by measuring the resistance of a device with the largest stripe height, the resistance of a device with the smallest stripe height, and the resistance of a device with the middle stripe height, a similar calculation can be made to estimate the stripe heights.

According to one aspect of the subject disclosure, once a linear relationship between the measured resistance of an ELG and the inverse stripe height of its resistive element has been determined, it becomes a simple matter to determine the appropriate stopping point for a lapping operation in which the resistance of the ELG is monitored. In this regard, by simply selecting a desired final stripe height for the ELG (e.g., based on a spatial relationship between the ELG and an adjacent device such as a read or write head to be lapped), the resistance of the ELG at which lapping should be stopped is easily calculated.

The foregoing exemplary technique for modeling the relationship between the resistance and stripe height of a device can also be applied to devices other than ELGs. For example, the device resistance of a magnetoresistive read head $R_{MRR}$ varies with respect to the stripe height thereof according to the relationship $R_{MRR} = R_{leads} + (RA/TW)/SH$. Accordingly, there exists a linear relationship between the resistance of the read head and the inverse of the stripe height thereof, where the intercept of the line is equal to the resistance of the leads of the read head, and where the slope of the line is equal to the device resistance area RA divided by the track width TW of the device. The slope and intercept of the line are then calculated as set forth above for the ELG example.

In accordance with one aspect of the subject disclosure, a wafer may include m pluralities of devices (e.g., ELGs or magnetoresistive read heads), each plurality of devices having a different stripe height than other ones of the plurality of devices, where m is any integer greater than or equal to 3. Providing a wafer with more than three different devices may enable evaluation of a correlation coefficient of the data set obtained as set forth above to assess whether the generated coefficients for the slope and intercept represent a good statistical fit to the data.

According to one aspect of the subject disclosure, a data set of values correlating measured resistances with estimated stripe heights may include information from every device on a wafer. Alternatively, the data set may contain information from a subset of the devices on the wafer. In accordance with one aspect of the subject disclosure, multiple data sets may be obtained to allow more local calibration to account for within-the-wafer (WIW) variation in fabrication.

A correlation coefficient may be calculated and used to detect erroneous data and re-calculate the required coefficients by either screening outliers or using the average of adjacent devices (e.g., devices in adjacent columns). This data can be evaluated at each column on a slider bar by either (i) calculating and assigning coefficient values in blocks of n bars where n>3, or (i) calculating and assigning coefficient values in rolling blocks of n bars where n>3.

For example, using a rolling sample where n=5 enables a unique correlation coefficient to be assigned by row and column for every row except the outermost two on either side of the wafer. Using the flash field as a logical boundary the lower two and upper two rows may share coefficients with the third row from the bottom or the third row from the top respectively. The flash field is an exposure field of the stepper, which may also be referred to as a stitch field. The majority of devices can use coefficients generated by data measured within +/−2 rows of the device. Alternatively a single set of coefficients could be shared across all 5 devices. It should be noted that if n>5, the assumption that similar wafer level characteristics will apply to each member of the data set of n devices is progressively weakened due to the increased physical separation of the devices.

The correlation coefficient r for a data set may be calculated according to the formula $$r = \frac{\sum (x - \bar{x})(y - \bar{y})}{\sqrt{\sum (x - \bar{x})^2 \sum (y - \bar{y})^2}}.$$

If $r^2$ is determined to be below a predetermined threshold, one or more correlated stripe height and resistance values may be removed from the data set before calculating the slope and intercept values. In this regard, if $r^2$ is determined to be below a predetermined threshold, residuals within the data set may be calculated, such that the correlated stripe height and resistance value corresponding to the largest calculated residual can be rejected, and the Intercept, Slope and $r^2$ can be recalculated with the remaining data. If data is removed from the data set, the coefficients to be used at this location will be based on the remaining stripe height and resistance values in the data set.

Figure 4:
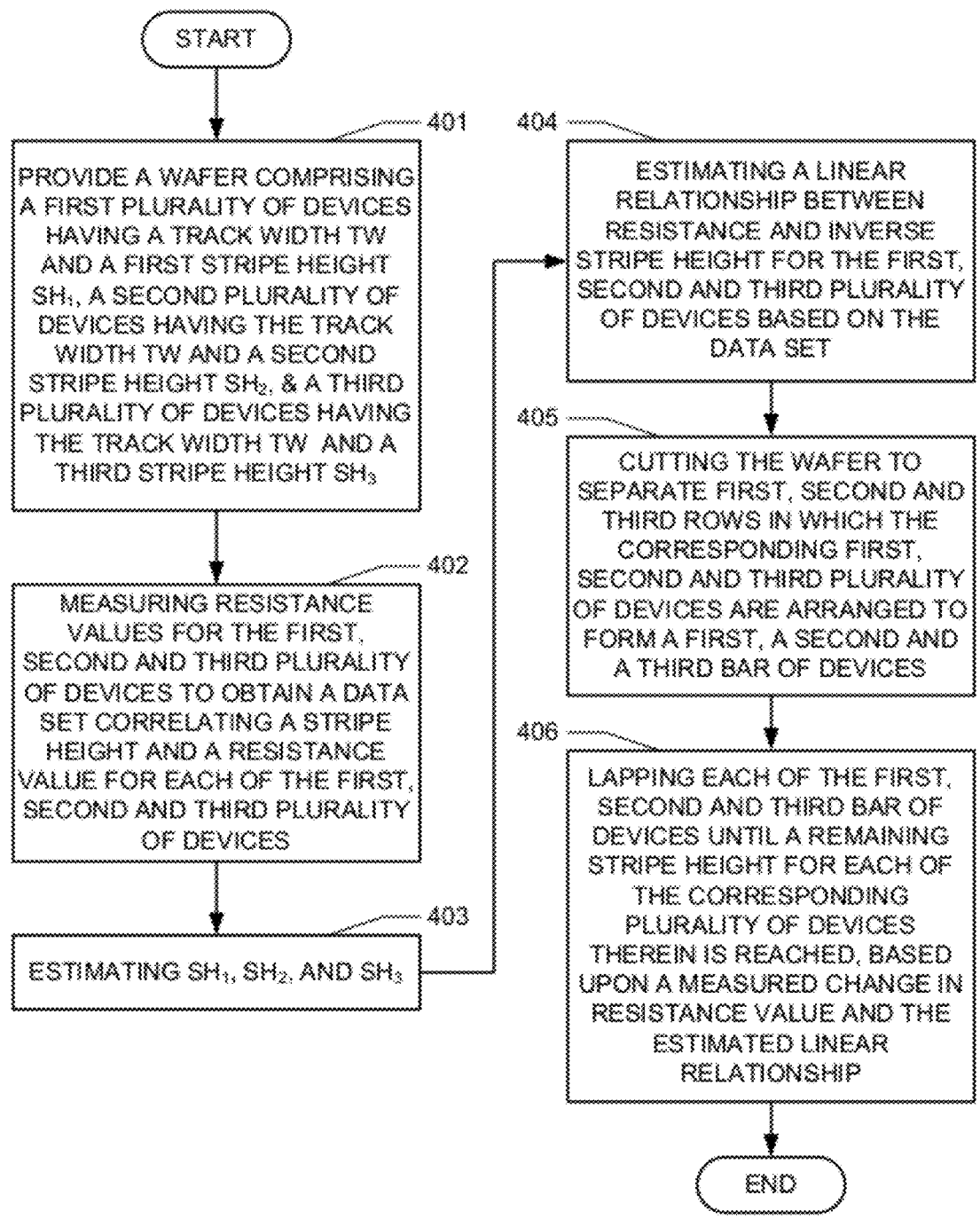
FIG. 4 is a flow chart illustrating a method of modeling devices in a wafer in accordance with one aspect of the subject disclosure.

FIG. 4 illustrates a method of modeling devices in a wafer in accordance with one aspect of the subject disclosure. The method begins with step 401, in which a wafer is provided, the wafer comprising a first plurality of devices having a track width TW and a first stripe height $SH_1$, a second plurality of devices having the track width TW and a second stripe height $SH_2$, and a third plurality of devices having the track width TW and a third stripe height $SH_3$. In step 402, resistance values for the first, second and third plurality of devices are measured to obtain a data set correlating a stripe height and a resistance value for each of the first, second and third plurality of devices. In step 403, $SH_1$, $SH_2$, and $SH_3$ may optionally be estimated based upon the measured resistance values. In step 404, a linear relationship between resistance and inverse stripe height is estimated for the first, second and third plurality of devices based on the data set. In step 405, the wafer is cut to separate first, second and third rows in which the corresponding first, second and third plurality of devices are arranged to form a first, a second and a third bar of devices. In step 406, each of the first, second and third bar of devices is lapped until a remaining stripe height for each of the corresponding plurality of devices therein is reached, based upon a measured change in resistance value and the estimated linear relationship.

The foregoing techniques according to embodiments of the invention may be used in other applications in which it is desirable to characterize resistance versus strip height for controlling lapping and/or polishing of a write head, near field transducer or any other device. For example, the techniques may be used to characterize resistance versus stripe height of ELGs for controlling lapping of a write head to achieve a desired nose length for the write head.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A method for modeling devices in a wafer, comprising the steps of:
   providing the wafer comprising a first plurality of devices having a track width TW and a first stripe height $SH_1$, a second plurality of devices having the track width TW and a second stripe height $SH_2$, and a third plurality of devices having the track width TW and a third stripe height $SH_3$;
   measuring resistance values for the first, second and third plurality of devices to obtain a data set correlating a stripe height and a resistance value for each of the first, second and third plurality of devices; and
   estimating a linear relationship between resistance and inverse stripe height for the first, second and third plurality of devices based on the data set,
   wherein $SH_1$ differs from $SH_2$ by a first predetermined amount $\delta H_1$, and wherein $SH_2$ differs from $SH_3$ by a second predetermined amount $\delta H_2$, such that $SH_1 + \delta H_1 = SH_2$ and $SH_2 + \delta H_2 = SH_3$.

2. The method according to claim 1, wherein the first, second and third plurality of devices comprise magnetoresistive transducers.

3. The method according to claim 1, wherein the first, second and third plurality of devices comprise electronic lapping guides.

4. The method according to claim 1, wherein $SH_1 \neq SH_2 \neq SH_3$.

5. The method according to claim 1, wherein the first predetermined amount $\delta H_1$ is equal to the second predetermined amount $\delta H_2$, such that $\delta H = \delta H_1 = \delta H_2$.

6. The method according to claim 5, further comprising the step of estimating $SH_1$, $SH_2$ and $SH_3$ according to the formula $SH_1 + \delta H = SH_3 - \delta H = SH_2 = 2\delta H((R_3 - R_1)/(R_3 + R_1 - 2R_2))$, wherein $R_1$ is a measured resistance value for one of the first plurality of devices, $R_2$ is a measured resistance value for one of the second plurality of devices, and $R_3$ is a measured resistance value for one of the third plurality of devices.

7. The method according to claim 1, wherein the wafer comprises m pluralities of devices, each plurality of devices having a different stripe height than other ones of the plurality of devices.

8. The method according to claim 7, wherein m is greater than 3.

9. The method according to claim 1, wherein the linear relationship between resistance R and inverse stripe height 1/SH is estimated according to the formula R=Intercept+Slope/SH, where $$\text{Slope} = \frac{\left(\sum_{i=1}^{n} x_i y_i\right) - n\overline{xy}}{\sum_{i=1}^{n} x_i^2 - n\overline{x}^2} \text{ and } \text{Intercept} = \frac{\overline{y}\left(\sum_{i=1}^{n} x_i^2\right) - \overline{x}\sum_{i=1}^{n} x_i y_i}{\sum_{i=1}^{n} x_i^2 - n\overline{x}^2},$$

and where n is a number of points in the data set, x is an inverse of a stripe height in the data set, and y is a resistance value in the data set.

10. The method according to claim 9, wherein the Intercept represents a resistance value of leads connected to each of the first, second and third plurality of devices.

11. The method according to claim 9, wherein the Slope represents a device resistance area (RA) divided by the track width TW.

12. The method according to claim 11, wherein the first, second and third plurality of devices comprise magnetoresistive transducers.

13. The method according to claim 9, wherein the first, second and third plurality of devices comprise electronic lapping guides, and wherein the Slope represents a sheet resistance times the track width TW.

14. The method according to claim 9, further comprising the step of estimating a correlation coefficient r for the data set according to the formula $$r = \frac{\sum (x - \overline{x})(y - \overline{y})}{\sqrt{\sum (x - \overline{x})^2 \sum (y - \overline{y})^2}}.$$

15. The method according to claim 14, wherein if $r^2$ is below a predetermined threshold, one or more correlated stripe height and resistance values are removed from the data set before estimating the linear relationship.

16. The method according to claim 15, further comprising averaging stripe height and resistance values from one or more devices adjacent to the devices corresponding to the removed values to replace the values removed from the data set.

17. The method according to claim 14, wherein if $r^2$ is below a predetermined threshold, residuals within the data set are calculated, the correlated stripe height and resistance value corresponding to the largest calculated residual is rejected, and the Intercept, Slope and $r^2$ are recalculated with the remaining data.

18. The method according to claim 1, wherein the first, second and third plurality of devices are arranged in corresponding first, second and third rows.

19. The method according to claim 18, further comprising the steps of:
   cutting the wafer to separate the first, second and third rows to form a first, a second and a third bar of devices; and
   lapping each of the first, second and third bar of devices until a remaining stripe height for each of the corresponding plurality of devices therein is reached, based upon a measured change in resistance value and the estimated linear relationship.

20. The method according to claim 19, wherein the step of cutting the wafer occurs after the step of estimating the linear relationship.

* * * * *